J. J. MOORE.
WHIFFLETREE HOOK.
APPLICATION FILED NOV. 24, 1903.
NO MODEL.
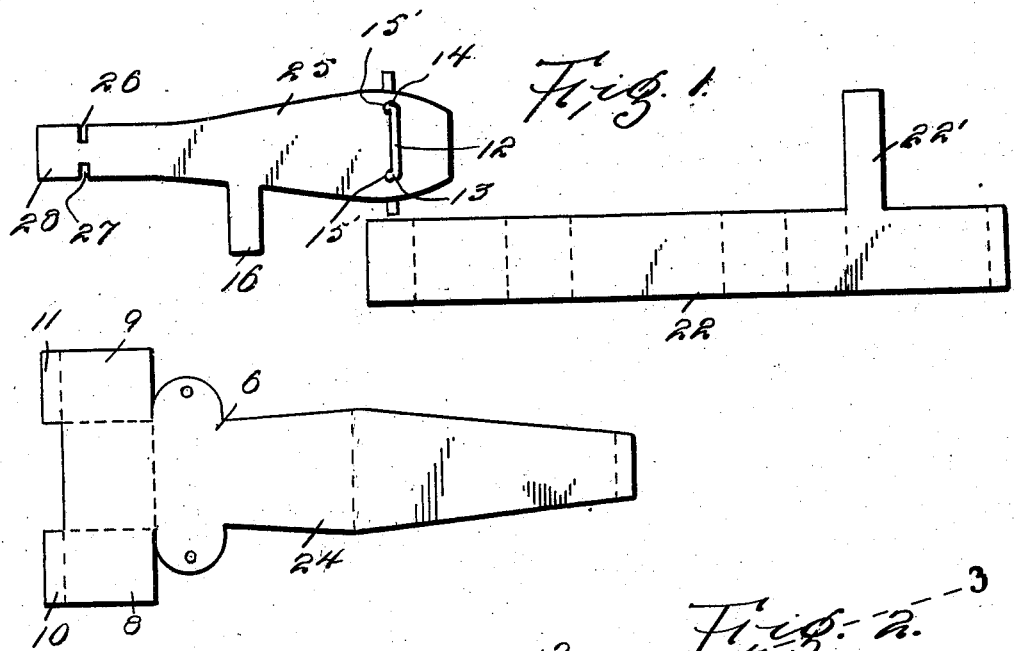
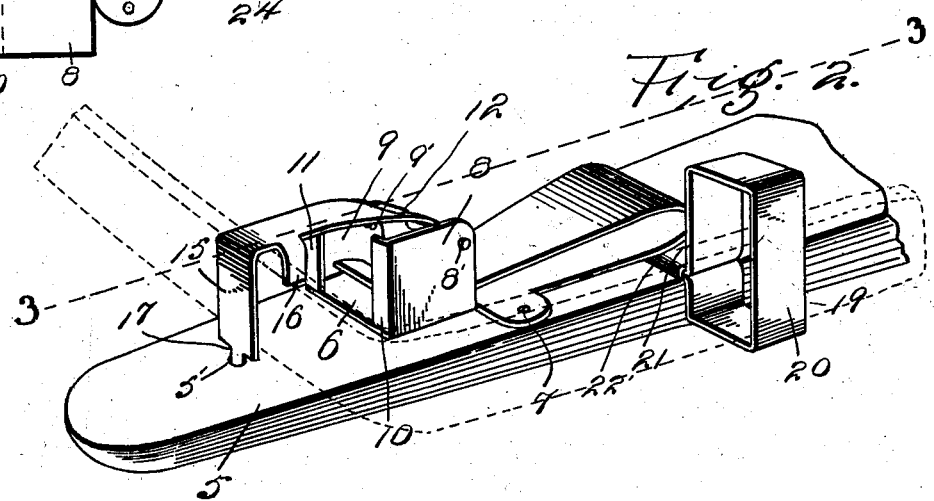
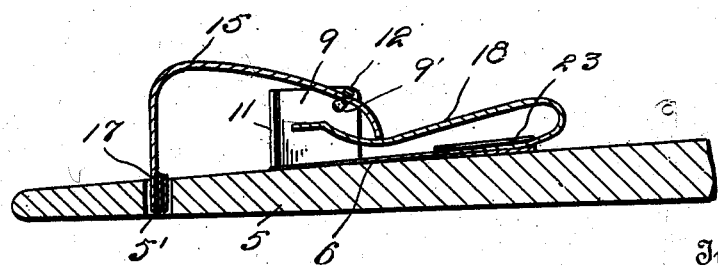
Witnesses
Inventor
John J. Moore
By
Attorneys.

No. 763,065.   Patented June 21, 1904.

UNITED STATES PATENT OFFICE.

JOHN J. MOORE, OF BULA, WEST VIRGINIA.

WHIFFLETREE-HOOK.

SPECIFICATION forming part of Letters Patent No. 763,065, dated June 21, 1904.

Application filed November 24, 1903. Serial No. 182,486. (No model.)

*To all whom it may concern:*

Be it known that I, JOHN J. MOORE, a citizen of the United States, residing at Bula, in the county of Monongalia, State of West Virginia, have invented certain new and useful Improvements in Whiffletree-Hooks; and I do hereby declare the following to be a full, clear, and exact description of the invention, such as will enable others skilled in the art to which it appertains to make and use the same.

This invention relates to whiffletrees, and more particularly to hooks therefor, and has for its object to provide a device of this nature which will prevent the trace end from becoming accidentally disengaged from the whiffletree and which may be formed from a stamped blank, thus insuring cheapness of manufacture.

In the drawings forming a portion of this specification, and in which like numerals of reference indicate similar parts in the several views, Figure 1 shows a top plan view of the three blanks from which the device is formed. Fig. 2 is a perspective view of the device as applied to a whiffletree. Fig. 3 is section on line 3 3 of Fig. 2.

Referring now to the drawings, there is shown the end 5 of a whiffletree, to which the hook is attached. The hook comprises a base-plate 6, which is secured to the whiffletree by screws 7 and which has upwardly-directed portions 8 and 9 at the side of the forward end, the forward edges of the upwardly-directed portions being bent at right angles to themselves, as shown at 10 and 11. The portions 8 and 9 are provided with perforations 8' and 9', each receiving the ends of a pin 12. The ends of the pin 12 are offset from the central portion thereof, resulting in angular portions 13 and 14, and these angular portions lie in perforations 15' of a hook 15, which extends upwardly and forwardly from between the portions 8 and 9 and has its bill turned in the direction of the whiffletree 5. A tongue 16 is formed upon one edge of the hook 15 and is bent to form a finger-piece 16, as shown. The whiffletree 5 is provided with a perforation 5', and with this perforation the bill 17 of the hook is normally engaged. The rearward end of the base-plate, which is of spring material, is bent upwardly and backwardly and lies between the upwardly-turned portions 8 and 9 and below the rearward end of the hook 15, against which it bears. There is thus formed a spring 18, which acts to hold the bill 17 of the hook normally in engagement with the perforation 5'.

A retaining-loop 19 is provided and consists of the loop portion 20 and a shank 21, which is disposed with the shank between the rearward portion of the base-plate 6 and the whiffletree, in which position it is held by the resiliency of the base-plate. The retaining-loop is formed from the blank 22, (shown in Fig. 1,) the laterally-projecting portion 22' being wrapped around the shank when the portion lying to one side of the projection is bent to form the loop 20. When the shank 21 is disposed beneath the base-plate, this portion 22' lies against one edge thereof, and the free end of the shank is bent upwardly and again parallel to itself to form a flange 23, which engages over the base-plate 6.

In Fig. 1 there are also shown blanks 24 and 25, the former being that from which the base-plate and elements attached thereto are formed and the latter that from which the hook is formed. The method of forming these members will be readily understood from the description thereof given above. The slots 26 and 27 in the blank 25 are provided to enable the portion 28 to be bent into cylindrical form, this portion forming the bill 17 of the hook 15, which is engaged with the perforations 5'.

In operation the hook 15 is raised by means of the finger-piece 16 and is thrown upwardly until its rearward end is disengaged from the spring 18, when the tension of the spring will tend to prevent its return to its normal position. The eye of a tug is now engaged with the end of the whiffletree and is disposed beyond the perforation 5', after which the hook 15 is returned to its normal position. Should the tug extend rearwardly beyond the whiffletree, it is turned, and its end is disposed in the retaining-loop 20.

In practice modifications of the specific construction shown may be made and any suitable materials and proportions may be used without departing from the spirit of the invention.

What is claimed is—

1. The combination with a whiffletree, of a hook comprising a spring-metal plate attached thereto having upwardly-directed lugs at one end, a hook pivoted between the lugs and lying with its bill normally in engagement with a whiffletree, the remaining end of the plate being bent upwardly and upon itself and lying between the lugs and below the base of the hook, to hold the latter at times yieldably in its normal position and at times yieldably out of its normal position and a loop having a shank projecting therefrom lying with its shank engaged between the spring-plate and the whiffletree.

2. The combination with a whiffletree, of a hook comprising a spring-metal plate having upwardly-directed lugs at one of its ends and having its remaining end bent upon itself and lying between the lugs and a hook pivoted between the lugs and lying with its bill normally in engagement with the whiffletree, the second-named end of the spring-plate bearing against base of the hook and acting to hold the hook yieldably at times in its normal position and at times yieldably out of its normal position.

In testimony whereof I affix my signature in presence of two witnessses.

JOHN J. MOORE.

Witnesses:
 ZORA PRICE,
 CLAUDE H. BOWMAN.